United States Patent
Kang et al.

(10) Patent No.: US 9,705,663 B2
(45) Date of Patent: Jul. 11, 2017

(54) COMMUNICATION SYSTEM HAVING SYNCHRONIZED UNITS AND SYNCHRONIZATION METHOD FOR UNITS

(71) Applicant: LG CHEM, LTD., Seoul (KR)

(72) Inventors: Ju-Hyun Kang, Daejeon (KR); Yasuhito Eguchi, Daejeon (KR); Shoji Tanina, Daejeon (KR)

(73) Assignee: LG CHEM, LTD., Seoul (KR)

(*) Notice: Subject to any disclaimer, the term of this patent is extended or adjusted under 35 U.S.C. 154(b) by 0 days.

(21) Appl. No.: 14/906,734

(22) PCT Filed: Oct. 16, 2014

(86) PCT No.: PCT/KR2014/009746
§ 371 (c)(1),
(2) Date: Jan. 21, 2016

(87) PCT Pub. No.: WO2015/056999
PCT Pub. Date: Apr. 23, 2015

(65) Prior Publication Data
US 2016/0164662 A1 Jun. 9, 2016

(30) Foreign Application Priority Data

Oct. 16, 2013 (KR) ........................ 10-2013-0123497

(51) Int. Cl.
*H04L 7/00* (2006.01)
*H04L 29/02* (2006.01)
(Continued)

(52) U.S. Cl.
CPC .............. *H04L 7/0012* (2013.01); *B60L 3/12* (2013.01); *B60L 11/1864* (2013.01); (Continued)

(58) Field of Classification Search
CPC ...... H04J 3/0667; H04J 3/0638; H04J 3/0688; G04G 7/00; H03L 7/07; H02J 1/102; H02J 7/0021; H02J 7/0024; H02J 7/0054; Y10T 307/25; G06F 1/26; H01M 10/4257; H01M 2010/4271; H02M 3/1584
See application file for complete search history.

(56) References Cited

U.S. PATENT DOCUMENTS 5,577,075 A * 11/1996 Cotton ...................... G06F 1/04
370/516
5,870,441 A * 2/1999 Cotton ...................... G06F 1/04
327/144

(Continued)

FOREIGN PATENT DOCUMENTS

CN 101478846 A 7/2009
JP 2002-252606 A 9/2002
(Continued)

OTHER PUBLICATIONS

International Search Report, issued in PCT/KR2014/009746, dated Jan. 26, 2015.

*Primary Examiner* — Khanh C Tran
(74) *Attorney, Agent, or Firm* — Birch, Stewart, Kolasch & Birch, LLP

(57) ABSTRACT

Disclosed are a communication system and a synchronization method for enabling synchronization of units included in the communication system in case of a communication line failure. In the communication system according to the present invention, all units are synchronized with the period of an ADSYNC outputted from a master unit when the ADSYNC, in which a data transmission preparation period and a data transmission period make a single cycle, is outputted from the master unit; slave units output a free-run ADSYNC when an ADSYNC is not outputted from the master unit; and, when a plurality of the slave units output free-run ADSYNCs, the slave units are synchronized with any one free-run ADSYNC from among the outputted free-run ADSYNCs.

12 Claims, 10 Drawing Sheets

(51) Int. Cl.
  *H02J 7/00*    (2006.01)
  *B60L 3/12*    (2006.01)
  *B60L 11/18*   (2006.01)
  *H01M 10/46*   (2006.01)
  *H04Q 9/04*    (2006.01)
  *H01M 10/42*   (2006.01)
  *H01M 10/44*   (2006.01)

(52) U.S. Cl.
  CPC ....... *H01M 10/425* (2013.01); *H01M 10/441* (2013.01); *H01M 10/46* (2013.01); *H02J 7/0004* (2013.01); *H02J 7/0013* (2013.01); *H02J 7/0047* (2013.01); *H04L 7/0004* (2013.01); *H04L 29/02* (2013.01); *H04Q 9/04* (2013.01); *H01M 2220/20* (2013.01); *H04Q 2209/30* (2013.01); *H04Q 2209/753* (2013.01); *H04Q 2209/845* (2013.01); *Y02T 10/7005* (2013.01); *Y02T 10/7061* (2013.01); *Y02T 90/16* (2013.01)

(56) References Cited

U.S. PATENT DOCUMENTS

| | | | | |
|---|---|---|---|---|
| 6,765,863 | B1* | 7/2004 | Wakimoto | H04J 3/0641 370/218 |
| 7,467,309 | B2* | 12/2008 | Templeton | H02J 1/102 713/300 |
| 7,793,005 | B1* | 9/2010 | Fernald | G06F 1/26 323/222 |
| 2001/0046241 | A1 | 11/2001 | Shimosakoda | |
| 2007/0040657 | A1* | 2/2007 | Fosler | H02J 1/08 340/333 |
| 2008/0129247 | A1 | 6/2008 | Lee et al. | |
| 2010/0295382 | A1 | 11/2010 | Tae et al. | |
| 2012/0074904 | A1 | 3/2012 | Rutkowski et al. | |
| 2012/0128372 | A1 | 5/2012 | Nakura et al. | |
| 2014/0125284 | A1* | 5/2014 | Qahouq | H02J 7/0065 320/118 |
| 2014/0312828 | A1* | 10/2014 | Vo | H01M 10/4257 320/103 |

FOREIGN PATENT DOCUMENTS

| | | |
|---|---|---|
| JP | 2007-281800 A | 10/2007 |
| JP | 2013-138344 A | 7/2013 |
| KR | 10-2006-0073525 A | 6/2006 |
| KR | 10-2010-0124499 A | 11/2010 |
| KR | 10-2011-0051093 A | 5/2011 |
| KR | 10-2012-0049225 A | 5/2012 |
| WO | 2011/016105 A1 | 2/2011 |

\* cited by examiner

COMMUNICATION SYSTEM HAVING SYNCHRONIZED UNITS AND SYNCHRONIZATION METHOD FOR UNITS

TECHNICAL FIELD

The present disclosure relates to a communication system and a synchronization method, and more particularly, to a communication system and a synchronization method that synchronizes units included in the communication system in the event of a failure in a communication line.

The present application claims priority to Korean Patent Application No. 10-2013-0123497 filed in the Republic of Korea on Oct. 16, 2013, the disclosures of which are incorporated herein by reference.

BACKGROUND ART

Due to its characteristics of being easily applicable to various products and electrical characteristics such as a high energy density, a secondary battery is not only commonly applied to a portable device, but universally applied to an electric vehicle (EV) or a hybrid vehicle (HV) that is propelled by an electric motor. This secondary battery is gaining attention for its primary advantage of remarkably reducing the use of fossil fuels and not generating by-products from the use of energy, making it a new eco-friendly and energy efficient source of energy.

A battery pack for use in electric vehicles generally has a structure consisting of a plurality of battery modules connected in series or in parallel, each battery module including a plurality of unit cells, to obtain high output. Also, the unit cell includes a positive electrode current collector and a negative electrode current collector, a separator, an active material, an electrolyte solution and a casing, and can be charged and discharged by electrochemical reactions between the components.

Also, the battery pack generally includes a battery management system (BMS) to monitor and control the state of secondary batteries by executing an algorithm for control of power supply to a driving load such as a motor, measurement of electrical characteristic values such as current or voltage, charge/discharge control, voltage equalization control, state of charge (SOC) estimation, and the like.

Recently, with the widespread use of a battery pack of a multi-module structure including a plurality of battery modules connected in series or in parallel, a method of integratedly controlling battery modules is used, in which a BMS is installed independently for each module and a correlation between BMSs is set on the basis of one master and multiple slaves.

A master unit set as a master BMS communicates with each slave unit set as a slave BMS to monitor the state of all the battery modules during charging/discharging of the battery pack, to collect electrical condition information (voltage, current, and temperature) of the battery modules each slave BMS manages and to transmit a control command necessary for voltage equalization or battery system protection or data required for the slave units.

For data transmission and reception, the master unit is connected to the slave units via communication lines, and data is transmitted and received using a communication protocol for the communication lines. As a related art, Korean Patent Application Publication No. 10-2012-0049225 discloses an example of transmitting and receiving data between units by way of serial peripheral interface (SPI) ports (see paragraph [0027]).

The SPI communication protocol needs at least two communication lines including a line for data transmission and reception and a clock line. Thus, when a failure such as disconnection occurs in any one of the two lines, even though the remaining communication line is in a normal connection state, data communication becomes impossible any longer.

The universal asynchronous receiver/transmitter (UART) enables communication using a single communication line. However, even in this case, communication may be disabled due to a failure in a central processing unit (CPU), for example.

Even though communication is disabled, if units are synchronized, voltage measurement or self-diagnosis is performed correctly and it is easy to know the content of data from the outside.

In contrast, even when communication is enabled, if units are not synchronized, each slave unit differs in timing of voltage measurement or self-diagnosis, so voltage measurement is not performed correctly or data obtained through voltage measurement may be unhelpful.

Accordingly, there is a need for a method that enables all units included in a communication system to do synchronized activities and perform data transmission and reception.

DISCLOSURE

Technical Problem

The present disclosure is designed to solve the problem of the related art, and therefore, the present disclosure is directed to providing a communication system and a synchronization method that synchronizes units included in the communication system in the event of a failure in a communication line.

Technical Solution

To achieve the object, a communication system according to the present disclosure includes a plurality of slave units in which adjacent slave units are connected via a signal line, and a master unit connected to the plurality slave units via a signal line, wherein when ADSYNC is outputted from the master unit, the slave units are all synchronized to a cycle of the ADSYNC outputted from the master unit, one cycle of the ADSYNC composed of a data transmission preparation section and a data transmission section, when ADSYNC is not outputted from the master unit, the slave units output free-run ADSYNCs, and when the free-run ADSYNCs are outputted from the plurality slave units, the slave units are synchronized to any one of the outputted free-run ADSYNCs.

According to one embodiment of the present disclosure, the ADSYNC may change in logic level of a signal between the data transmission preparation section and a start point of the data transmission section.

In this case, the slave units may be synchronized to free-run ADSYNC with a smallest width of a data transmission preparation section and a smallest width of an ADSYNC cycle among the free-run ADSYNCs outputted from the plurality of slave units.

According to one embodiment of the present disclosure, the plurality of slave units may store a minimum width of a preset data transmission preparation section. In this case, a minimum width of a preset ADSYNC cycle, and the plurality of slave units may be synchronized in association with the minimum width of the preset data transmission preparation section and the minimum width of the preset ADSYNC cycle based on the ADSYNC outputted from the master unit.

The synchronization in association with the minimum width of the preset data transmission preparation section and the minimum width of the preset ADSYNC cycle may represent that a width of a data transmission preparation section of a synchronized ADSYNC is greater than the minimum width of the preset data transmission preparation section and a synchronized ADSYNC cycle is greater than the minimum width of the preset ADSYNC cycle.

The communication system according to the present disclosure may be one element of a battery pack including the communication system and secondary batteries connected to the slave units of the communication system. In this instance, the slave units may include battery management systems to control the charge and discharge of the secondary batteries.

The battery pack according to the present disclosure may be one element of a battery operating system including the battery pack and a load which is supplied with power from the battery pack.

To achieve the object, a method of synchronizing units in a communication system according to the present disclosure corresponds to a method of synchronizing slave units in a communication system including a plurality of slave units in which adjacent slave units are connected via a signal line, and a master unit connected to the plurality slave units via a signal line, and the method includes (a) synchronizing all the slave units to a cycle of ADSYNC outputted from the master unit when the ADSYNC is outputted from the master unit, one cycle of the ADSYNC composed of a data transmission preparation section and a data transmission section, (b) outputting free-run ADSYNCs from the slave units when ADSYNC is not outputted from the master unit, and (c) synchronizing the slave units to any one free-run ADSYNC among the free-run ADSYNCs outputted from the plurality of slave units when the free-run ADSYNCs are outputted from the plurality slave units.

According to one embodiment of the present disclosure, the step (c) may include synchronizing the slave units to free-run ADSYNC with a smallest width of a data transmission preparation section and a smallest width of an ADSYNC cycle among the free-run ADSYNCs outputted from the plurality of slave units.

According to one embodiment of the present disclosure, the plurality of slave units may store a minimum width of a preset data transmission preparation section and a minimum width of a preset ADSYNC cycle, and the step (a) may include synchronizing the plurality of slave units in association with the minimum width of the preset data transmission preparation section and the minimum width of the preset ADSYNC cycle based on the ADSYNC outputted from the master unit.

The synchronizing in association with the minimum width of the preset data transmission preparation section and the minimum width of the preset ADSYNC cycle in the step (a) may represent that a width of a data transmission preparation section of a synchronized ADSYNC is greater than the minimum width of the preset data transmission preparation section and a synchronized ADSYNC cycle is greater than the minimum width of the preset ADSYNC cycle.

Advantageous Effects

According to one aspect of the present disclosure, even when a failure such as disconnection occurs in a certain signal line, data transmission and reception is enabled using the remaining signal line.

According to another aspect of the present disclosure, by synchronizing ADSYNC in a free-run mode, various measurements and self-diagnosis may be carried out in a synchronized manner. Also, the synchronized data may be transmitted to the outside.

According to still another aspect of the present disclosure, a temporary communication error may be dealt with, and a stop error in the entire system caused thereby may be prevented.

BRIEF DESCRIPTION OF THE DRAWINGS

The accompanying drawing illustrates a preferred embodiment of the present disclosure and together with the foregoing disclosure, serves to provide further understanding of the technical spirit of the present disclosure, and thus, the present disclosure is not construed as being limited to the drawing.

MODE FOR CARRYING OUT THE INVENTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 1:
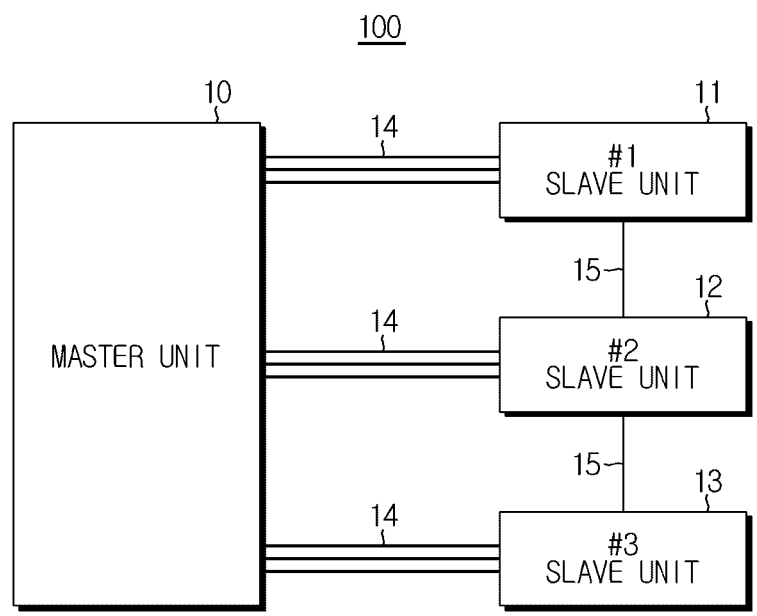
FIG. 1 is a block diagram schematically illustrating the architecture of a communication system according to an exemplary embodiment of the present disclosure.

FIG. 1 is a block diagram schematically illustrating the architecture of a communication system 100 according to an exemplary embodiment of the present disclosure.

Referring to FIG. 1, the communication system 100 according to the present disclosure includes a master unit 10 and a plurality of slave units 11, 12, and 13. Although FIG. 1 shows three slave units 11, 12, and 13, the number of the slave units 11, 12, and 13 according to the present disclosure may be various and the present disclosure is not limited to the disclosed embodiment.

The master unit 10 is connected to each of the slave units 11, 12, and 13 via signal lines 14. Also, the slave units 11, 12, and 13 are connected to each other via a signal line 15. The signal lines 14 and 15 provide an electrical connection for data transmission and reception.

For the convenience of description, assume the communication system 100 according to the present disclosure is a battery pack including secondary batteries. The slave units 11, 12, and 13 are connected to a plurality of secondary batteries (not shown), and each of the slave units 11, 12, and 13 includes a battery management system (BMS) (not shown) to control the charge/discharge of the secondary batteries. The BMS performs various control functions applicable at the ordinary level, including measurement of electrical characteristic values including voltage or electric current, charge/discharge control, voltage equalization control, and state of charge (SOC) estimation for each of the secondary batteries. Thus, the slave units 11, 12, and 13 may transmit data associated with the state of the secondary batteries, for which the slave units 11, 12, and 13 are responsible, to the master unit 10, or receive a control signal related to the charge/discharge of the secondary batteries from the master unit 10, through the signal lines 14.

Referring to FIG. 1, the master unit 10 is shown as being connected to each of the slave units 11, 12, and 13 with three signal lines 14. In normal condition, the master unit 10 and each of the slave units 11, 12, and 13 transmit and receive data through at least two signal lines 14. In this instance, the master unit 10 and the slave units 11, 12, and 13 may use the SPI communication protocol.

Figure 2:
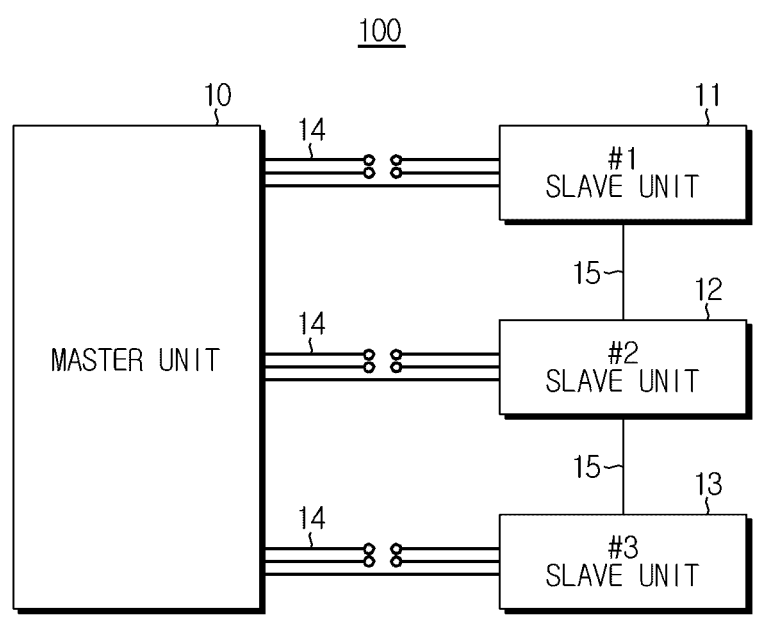
FIG. 2 is a block diagram illustrating disconnection occurred in signal lines.

FIG. 2 is a block diagram illustrating disconnection occurred in the signal lines 14.

Referring to FIG. 2, two of the three signal lines connected between the master unit 10 and each of the slave units 11, 12, and 13 are found disconnected. The SPI communication protocol previously presented as an example needs at least two communication line including a line for data transmission and reception and a clock line.

The universal asynchronous receiver/transmitter (UART) enables communication using a single communication line. However, even in this case, communication may be disabled due to a failure in a central processing unit (CPU), for example.

Even though communication is disabled, if units are synchronized, voltage measurement or self-diagnosis is performed correctly and it is easy to know the content of data from the outside.

In contrast, even when communication is enabled, if units are not synchronized, each slave unit differs in timing of voltage measurement and self-diagnosis, so voltage measurement is not performed correctly or data obtained through voltage measurement is unhelpful. Hereinafter, one of the problems of non-synchronization is cited as an example.

For example, assume the master unit 10 commands each of the slave units 11, 12, and 13 to measure a current voltage and transmit a voltage value with an aim of voltage equalization control. If the slave units 11, 12, and 13 are not synchronized, each of the slave units 11, 12, and 13 measures the voltage at different times, and the master unit 10 may command the voltage equalization control using voltage values measured at different times. As a result, effective voltage equalization may not be achieved. Therefore, to prevent the problem, there is a need for synchronization between units included in the communication system 100.

The communication system 100 according to the present disclosure synchronizes units using a communication protocol ADSYNC.

Also, the communication system 100 according to the present disclosure may enable overlapping of communication based on a single-line communication protocol (UART communication protocol) after synchronization using ADSYNC. Also, data transmission and reception may be performed using the overlapped communication protocol (UART communication protocol). In normal condition, data communication is carried out via SPI, but when SPI communication is disenabled due to disconnection or other reasons, communication may be carried out using ADSYNC. That is, synchronization and communication is enabled via one remaining communication line. In the worst case, for example, even though communication is disenabled due to a CPU failure, synchronization may be enabled and many effects described in the foregoing may be expected. As an example of overlapping communication, the use of a minimum width of a preset transmission preparation section and a minimum width of a preset ADSYNC cycle is cited. This method is very simple overlapping communication, and its detailed description is omitted herein.

Figure 3:
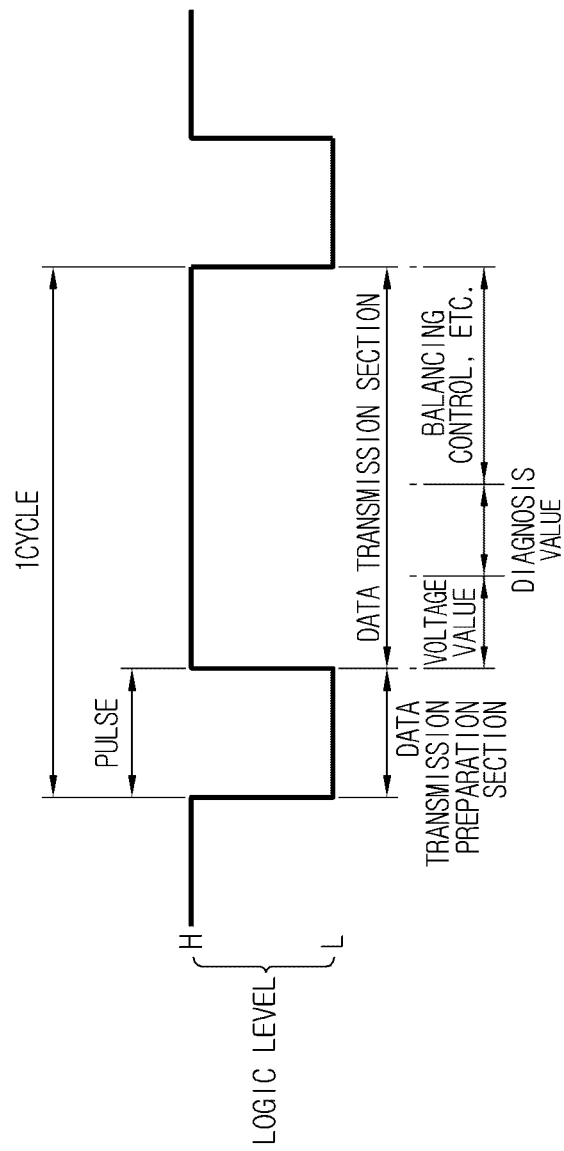
FIG. 3 is a waveform diagram illustrating a configuration of ADSYNC according to an exemplary embodiment of the present disclosure.

FIG. 3 is a waveform diagram illustrating a configuration of ADSYNC according to an exemplary embodiment of the present disclosure.

One cycle of the ADSYNC consists of a data transmission preparation section and a data transmission section. To distinguish the data transmission preparation section from the data transmission section, the ADSYNC changes in logic level of the signal between a start point of the data transmission preparation section and a start point of the data transmission section. According to an exemplary embodiment of the present disclosure, the data transmission preparation section allows output as a high logic level signal (H), and the data transmission section allows output as a low logic level signal (L). The high logic level may be set to 5V and the low logic level may be set to 0V, but the present disclosure is not limited to the example. In this instance, it will be readily appreciated if the data transmission preparation section illustrated in the drawing is interpreted as a preset minimum width, and one cycle is interpreted as a minimum width of a preset ADSYNC cycle.

The units synchronized by the ADSYNC may collect data intended to transmit, for example, data associated with voltage measurement and failure diagnosis, during the data transmission preparation section. Also, the units synchronized by the ADSYNC may transmit and receive the collected data within a preset width during the data transmission section. As shown in the example of FIG. 3, a front part may be set for a voltage value, an intermediate part for a diagnosis value, and an end part for balancing control, etc.

Here, the ADSYNC cycle presented as below refers to one cycle of the signal composed of the data transmission preparation section and the data transmission section (ADSYNC cycle =data transmission preparation section+ data transmission section).

According to the present disclosure, when ADSYNC is outputted from the master unit 10, the slave units 11, 12, and 13 are all synchronized to the cycle of the ADSYNC outputted from the master unit 10.

Figure 4:
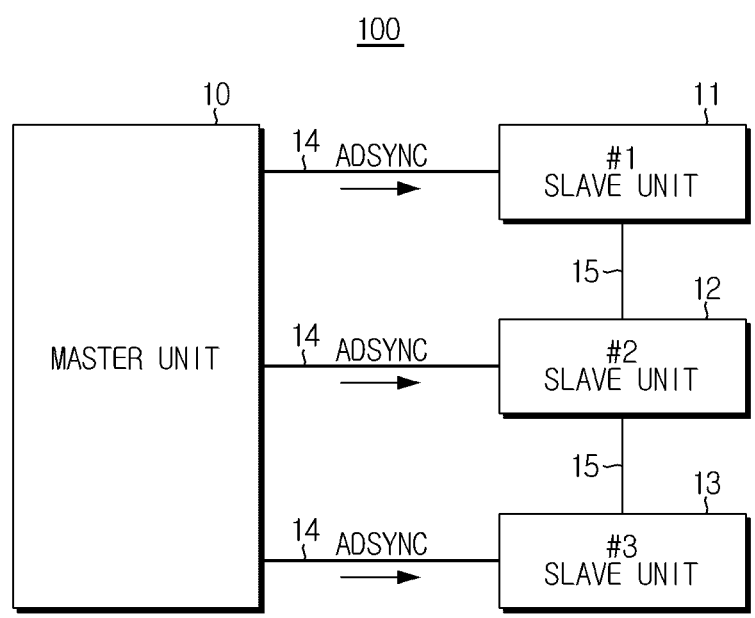
FIG. 4 is a block diagram illustrating that ADSYNC is outputted from a master unit according to the present disclosure.

FIG. 4 is a block diagram illustrating that ADSYNC is outputted from the master unit 10 according to the present disclosure.

Referring to FIG. 4, it can be seen that ADSYNC is outputted from the master unit 10 through non-disconnected signal lines 14. As shown in FIG. 4, when any one of the signal lines 14 connected between the master unit 10 and the slave units 11, 12, and 13 is not disconnected and the master unit 10 normally works, the slave units 11, 12, and 13 are synchronized by the ADSYNC outputted from the master unit 10.

Figure 5:
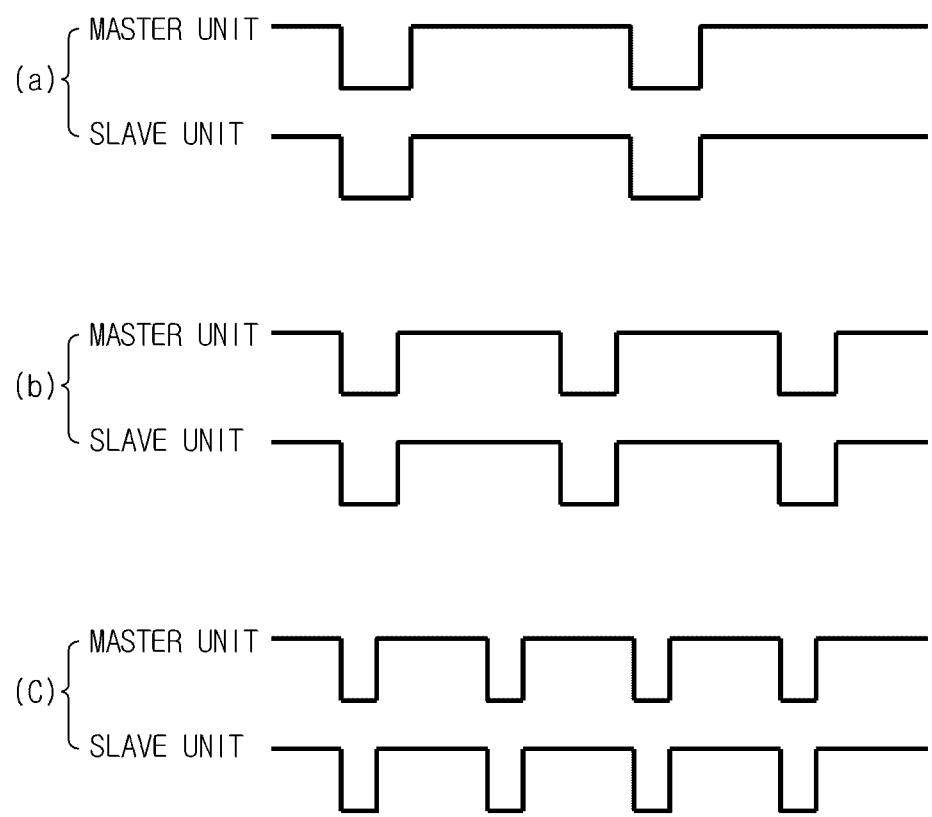
FIG. 5 is a waveform diagram illustrating that ADSYNCs of slave units are synchronized to ADSYNC of a master unit when the ADSYNC is outputted from the master unit according to the present disclosure.

FIG. 5 is a waveform diagram illustrating that ADSYNCs of the slave units 11, 12, and 13 are synchronized to ADSYNC of the master unit 10 when the ADSYNC is outputted from the master unit 10 according to the present disclosure.

Referring to (a) through (c) of FIG. 5, it can be seen that ADSYNCs of the slave units 11, 12, and 13 are synchronized to match a data transmission preparation section width and an ADSYNC cycle of the ADSYNC outputted from the master unit 10.

According to an exemplary embodiment of the present disclosure, the plurality of slave units 11, 12 and 13 stores a minimum width of the preset data transmission preparation section and a minimum width of the preset ADSYNC cycle. Also, the plurality of slave units 11, 12 and 13 is synchronized in association with the minimum width of the preset data transmission preparation section and the minimum width of the preset ADSYNC cycle based on the ADSYNC outputted from the master unit 10.

The synchronization in association with the minimum width of the preset data transmission preparation section and the minimum width of the preset ADSYNC cycle may represent that a width of a data transmission preparation section of a synchronized ADSYNC is greater than the minimum width of the preset data transmission preparation section and a synchronized ADSYNC cycle is greater than the minimum width of the preset ADSYNC cycle. For convenience of understanding, its description is provided with reference to FIG. 6.

Figure 6:
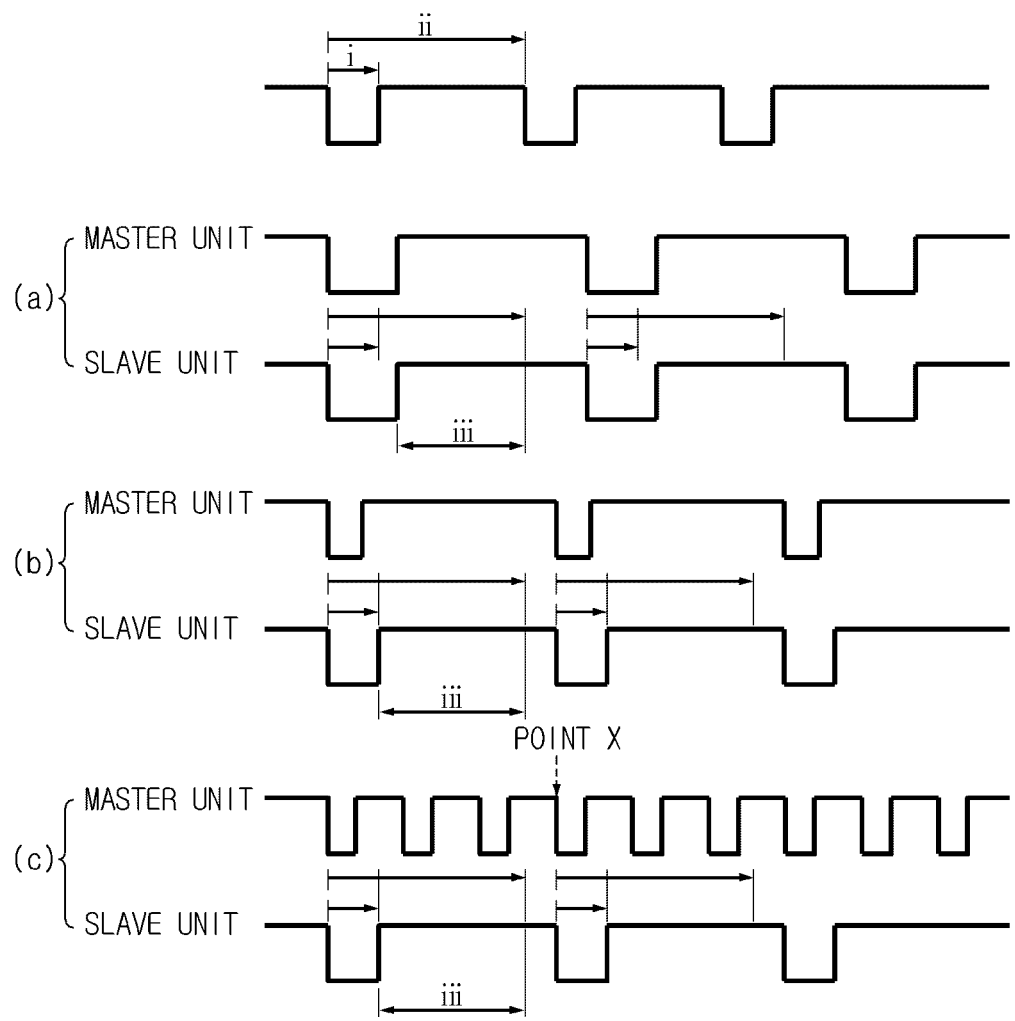
FIG. 6 is a waveform diagram illustrating that ADSYNCs of slave units are synchronized when a data transmission preparation section and an ADSYNC cycle are preset according to an exemplary embodiment of the present disclosure.

FIG. 6 is a waveform diagram illustrating that ADSYNCs of the slave units 11, 12, and 13 are synchronized when a data transmission preparation section and an ADSYNC cycle are preset according to an exemplary embodiment of the present disclosure.

First, on the top of FIG. 6, the representation of the preset data transmission preparation section (i) and the preset ADSYNC cycle (ii) in logic level is provided. It will be readily appreciated if the data transmission preparation section illustrated in the drawing is interpreted as a preset minimum width (i) and one ADSYNC cycle is interpreted as a preset minimum width (ii).

Subsequently, seeing (a) of FIG. 6, it is found that a data transmission preparation section and an ADSYNC cycle of ADSYNC outputted from the master unit 10 are greater than the minimum width (i) of the preset data transmission preparation section and the minimum width (ii) of the preset ADSYNC cycle. Thus, the slave units 11, 12, and 13 are synchronized to match the ADSYNC outputted from the master unit 10.

Subsequently, seeing (b) of FIG. 6, it is found that a width of a data transmission preparation section of ADSYNC outputted from the master unit 10 is smaller than the minimum width (i) of the preset data transmission preparation section and an ADSYNC cycle is greater than the minimum width of the ADSYNC cycle. In this case, the slave units 11, 12, and 13 are synchronized to ADSYNC with the same cycle width as that of the ADSYNC outputted from the master unit 10 while having the minimum width (i) of the preset data transmission preparation section.

Subsequently, seeing (c) of FIG. 6, it is found that a width of a data transmission preparation section of ADSYNC outputted from the master unit 10 and a cycle width of the ADSYNC are all smaller than the minimum width (i) of the preset data transmission preparation section and the minimum width (ii) of the ADSYNC cycle. In this case, the slave units 11, 12, and 13 are synchronized to the minimum width (i) of the preset data transmission preparation section and the minimum width (ii) of the ADSYNC cycle. Rather, a next ADSYNC may be synchronized to a start point (point X) of the data transmission preparation section of the master unit 10 appearing subsequent to the minimum width (ii) of the preset ADSYNC cycle.

That is, when the width of the data transmission preparation section and the width of the ADSYNC cycle of the ADSYNC outputted from the master unit 10 are greater than the minimum width (i) of the preset data transmission preparation section and the minimum width (ii) of the preset ADSYNC cycle, the slave units 11, 12, and 13 are synchronized to the ADSYNC outputted from the master unit 10. In contrast, when the width of the data transmission preparation section and the width of the ADSYNC cycle of the ADSYNC outputted from the master unit 10 are smaller than the minimum width (i) of the preset data transmission preparation section and the minimum width (ii) of the preset ADSYNC cycle, the slave units 11, 12, and 13 are synchronized to assure the minimum width (i) of the preset data transmission preparation section and the minimum width (ii) of the preset ADSYNC cycle.

In this instance, the section (iii) as shown in (a), (b) and (c) of FIG. 6 allows data transmission and reception by data addition (overlapping). However, even though multiple waveforms are added in the section (iii), it does not influence ADSYNC, so communication waveforms may overlap. Thus, during the section (iii), data transmission and reception is enabled by adding (overlapping) a signal in accordance with UART or other communication protocols.

The minimum width (i) of the preset data transmission preparation section may be variously set in consideration of an amount of data to be collected by the slave units 11, 12, and 13, the performance of the slave units 11, 12, and 13, an amount of data to be transmitted, and the communication capacity of the signal lines 14 and 15.

According to the present disclosure, when ADSYNC is not outputted from the master unit 10, the slave units 11, 12, and 13 output free-run ADSYNC.

Figure 7:
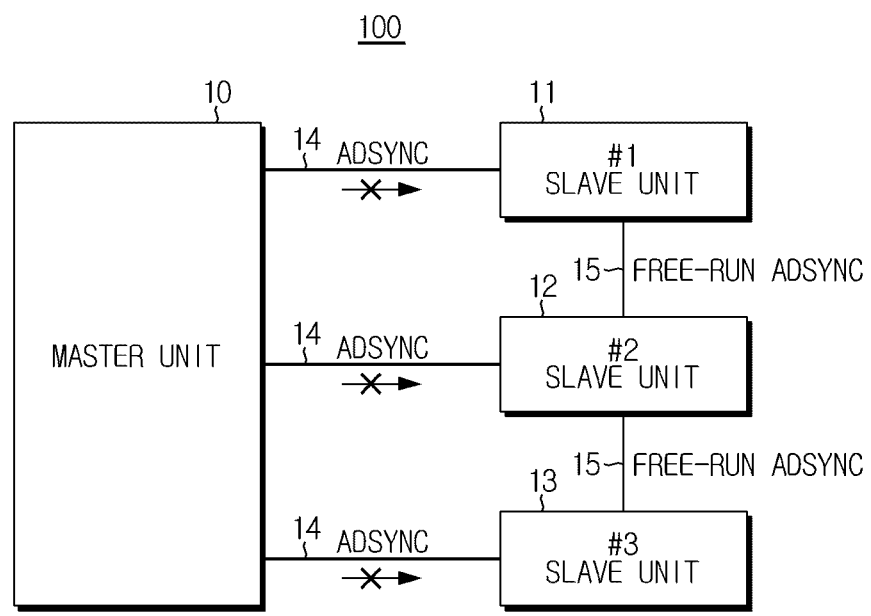
FIG. 7 is a block diagram illustrating that free-run ADSYNCs are outputted between slave units according to an exemplary embodiment of the present disclosure.

FIG. 7 is a block diagram illustrating that free-run ADSYNCs are outputted between the slave units 11, 12, and 13 according to an exemplary embodiment of the present disclosure.

Referring to FIG. 7, this is the case in which ADSYNC is not outputted from the master unit 10. The non-output of ADSYNC from the master unit 10 may imply a temporary or permanent function loss of a CPU within the master unit 10. In this case, the slave units 11, 12, and 13 detect the non-output of ADSYNC from the master unit 10, and output free-run ADSYNC through the signal line 15 interconnected between the slave units 11, 12, and 13. In the specification, the free-run ADSYNC refers to a preparative signal for synchronization between the slave units 11, 12 and 13.

Figure 8:
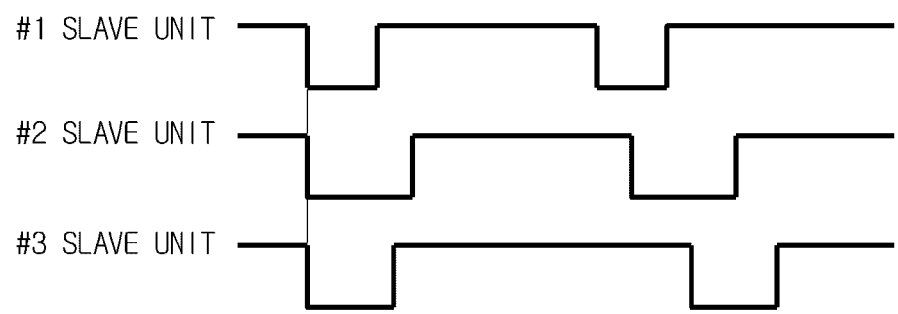
FIG. 8 is a waveform diagram illustrating free-run ADSYNCs outputted from slave units according to an exemplary embodiment of the present disclosure.

FIG. 8 is a waveform diagram illustrating free-run ADSYNCs outputted from the slave units 11, 12, and 13 according to an exemplary embodiment of the present disclosure.

Referring to FIG. 8, it can be seen that free-run ADSYNCs outputted from the #1 slave unit 11 through the #3 slave unit 13 differ in a width of a data transmission preparation section and a width of an ADSYNC cycle. The free-run ADSYNCs of each of the slave units 11, 12 and 13 allow the slave units 11, 12 and 13 to detect them through the signal line 15.

In this instance, the slave units 11, 12 and 13 according to the present disclosure are synchronized to any one of the outputted free-run ADSYNCs.

According to an exemplary embodiment of the present disclosure, the slave units 11, 12 and 13 are synchronized to free-run ADSYNC with a smallest width of a data transmission preparation section and a smallest width of an ADSYNC cycle among the free-run ADSYNCs outputted from the plurality of slave units.

Figure 9:
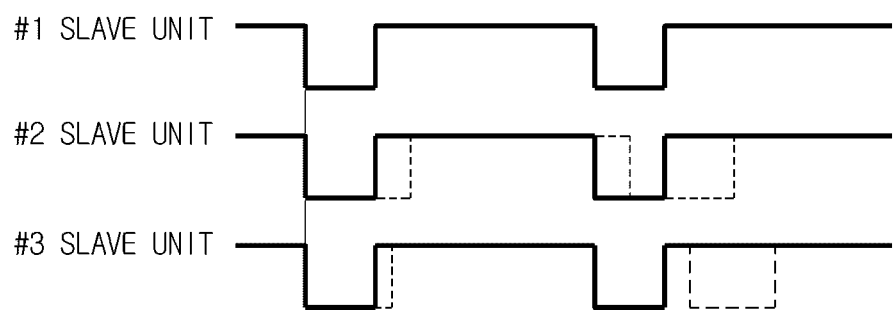
FIG. 9 is a waveform diagram illustrating synchronized free-run ADSYNCs according to an exemplary embodiment of the present disclosure.

FIG. 9 is a waveform diagram illustrating synchronized free-run ADSYNCs according to an exemplary embodiment of the present disclosure.

Referring to FIGS. 8 and 9 together, it can be seen in FIG. 8 that the width of the data transmission preparation section of the #1 slave unit 11 is smallest, and one cycle of the free-run ADSYNC is earliest. Thus, according to an exemplary embodiment of the present disclosure, it can be seen in FIG. 9 that the free-run ADSYNCs of the #2 slave unit 12 and the #3 slave unit 13 are synchronized with the free-run ADSYNC of the #1 slave unit 11.

The communication system 100 according to the present disclosure may be one component of a battery pack including the communication system 100 and the secondary batteries connected to the slave units 11, 12, and 13 of the communication system 100. In this instance, BMSs may be included in the slave units to control the charge/discharge of the secondary batteries.

The battery pack according to the present disclosure may be one component of a battery operating system including the battery pack and a load which is supplied with power from the battery pack.

The battery operating system may include, for example, an electric vehicle (EV), a hybrid electric vehicle (HEV), an electric bike (E-Bike), a power tool, an energy storage system, an uninterruptible power supply (UPS), a portable computer, a mobile phone, a portable audio device, a portable video device, and the like, and the load may include, for example, a motor that generates a rotational force by power supplied from the battery pack, or a power inverter circuit that inverts power supplied from the battery pack to power required for various circuit components.

Hereinafter, a method of synchronizing units in the communication system 100 is described. However, in the description of the method according to the present disclosure, because the architecture of the communication system 100 has been described in detail, an overlapping description is omitted herein.

Figure 10:
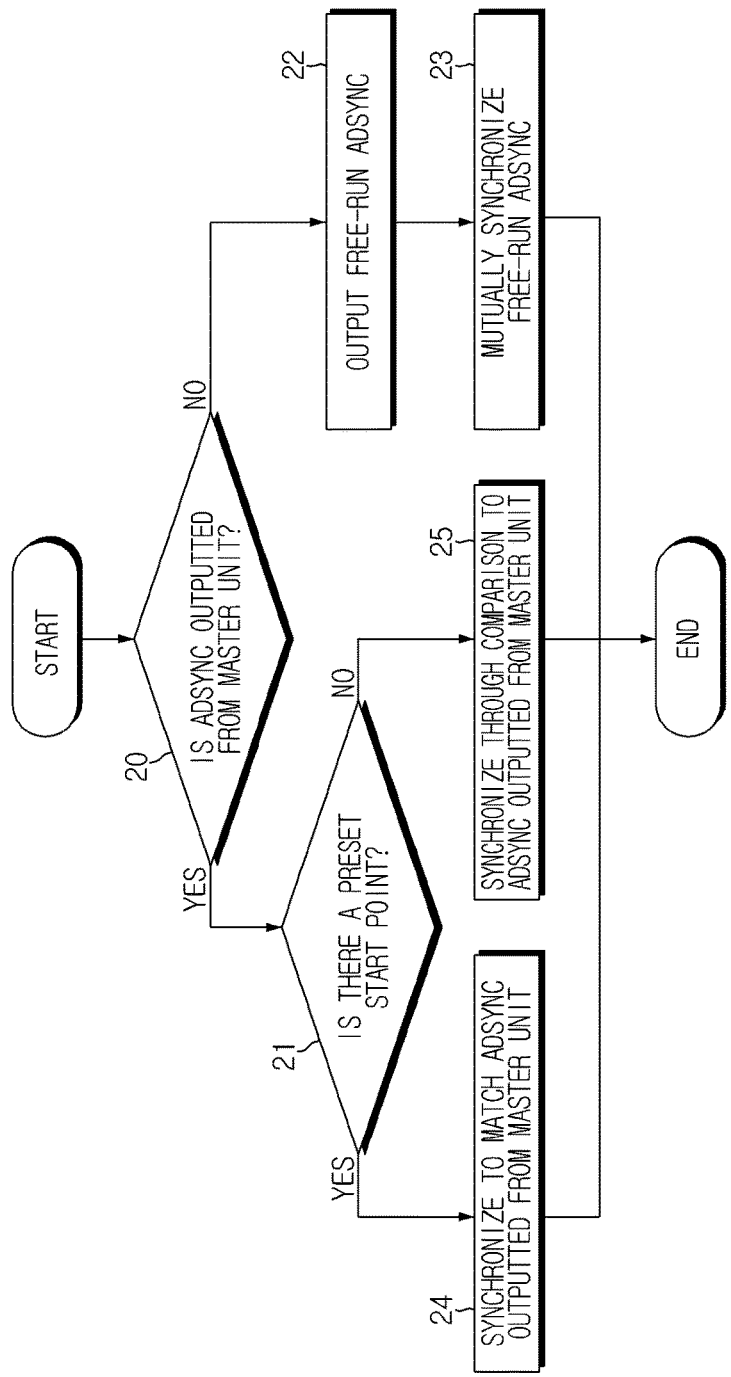
FIG. 10 is a flowchart illustrating a method of synchronizing units in a communication system according to an exemplary embodiment of the present disclosure.

FIG. 10 is a flowchart illustrating a method of synchronizing units in the communication system according to an exemplary embodiment of the present disclosure.

First, at step 20, the plurality of slave units 11, 12, and 13 determines if ADSYNC is outputted from the master unit 10, one cycle of the ADSYNC consisting of a data transmission preparation section and a data transmission section. When ADSYNC is outputted from the master unit 10 (YES at step 10), a processor of the method advances to step 21. In contrast, when ADSYNC is not outputted from the master unit 10 (NO at step 10), the processor of the method advances to step 22.

At step 22, the plurality of slave units 11, 12, and 13 outputs free-run ADSYNCs. Also, the processor of the method advances to step 23. At step 23, the plurality of slave units is synchronized to any one of the outputted free-run ADSYNCs.

According to an exemplary embodiment of the present disclosure, the plurality of slave units 11, 12, and 13 is synchronized to free-run ADSYNC with a smallest width of a data transmission preparation section and a smallest width of an ADSYNC cycle among the outputted free-run ADSYNCs. Then, the method is existed.

When at step 20, ADSYNC is outputted from the master unit 10 (YES at step 20) and the processor of the method advances to step 21, the method is as follows.

At step 21, the plurality of slave units 11, 12, and 13 determines if a minimum width of a preset data transmission preparation section and a minimum width a preset ADSYNC cycle are stored. When the minimum width of the preset data transmission preparation section and the minimum width of the preset ADSYNC cycle are stored in the plurality of slave units 11, 12, and 13 (YES at step 21), the processor of the method advances to step 24. In contrast, when the minimum width of the preset data transmission preparation section and of the minimum width the preset ADSYNC cycle are not stored in the plurality of slave units 11, 12, and 13 (NO at step 21), the processor of the method advances to step 25.

At step 22, the plurality of slave units 11, 12, and 13 is synchronized to the cycle of the ADSYNC outputted from the master unit 10. Then, the method is existed.

When at step 21, the minimum width of the preset data transmission preparation section and of the minimum width the preset ADSYNC cycle are stored in the plurality of slave units 11, 12, and 13 (YES at step 21) and the processor of the method advances to step 24, the method is as follows.

At step 24, the plurality of slave units 11, 12, and 13 is synchronized in association with the minimum width of the preset data transmission preparation section and of the minimum width the preset ADSYNC cycle based on the ADSYNC outputted from the master unit 10.

According to an exemplary embodiment of the present disclosure, the synchronization in association with the minimum width of the preset data transmission preparation section and of the minimum width the preset ADSYNC cycle may imply that a width of a data transmission preparation section of the synchronized ADSYNC is greater than the minimum width of the preset data transmission preparation section, and the synchronized ADSYNC cycle is greater than the minimum width of the preset ADSYNC cycle.

According to the present disclosure, even when a failure such as disconnection occurs in a certain signal line, data transmission and reception is enabled using the remaining signal. Also, according to another aspect of the present disclosure, through ADSYNC synchronization to free-run, various measurements and self-diagnosis may be carried out in a synchronized manner. Also, the synchronized data may be transmitted to the outside. Further, a temporary communication error may be dealt with, and a stop error in the entire system caused thereby may be prevented.

In the description of the present disclosure, it should be understood that each element of the present disclosure shown in FIGS. 1, 2, 4, and 7 is distinguished logically rather than physically.

What is claimrd is:

1. A communication system comprising:
a plurality of slave units in which adjacent slave units are connected via a signal line; and
a master unit connected to the plurality slave units via a signal line,
wherein when ADSYNC is outputted from the master unit, the slave units are all synchronized to a cycle of the ADSYNC outputted from the master unit, one cycle of the ADSYNC composed of a data transmission preparation section and a data transmission section,
when ADSYNC is not outputted from the master unit, the slave units output free-run ADSYNCs, and
when the free-run ADSYNCs are outputted from the plurality slave units, the slave units are synchronized to any one of the outputted free-run ADSYNCs,
wherein the ADSYNC changes in logic level of a signal between the data transmission preparation section and a start point of the data transmission section.

2. The communication system according to claim 1, wherein the slave units are synchronized to free-run ADSYNC with a smallest width of a data transmission preparation section and a smallest width of an ADSYNC cycle among the free-run ADSYNCs outputted from the plurality of slave units.

3. The communication system according to claim 1, wherein the plurality of slave units stores a minimum width of a preset data transmission preparation section and a minimum width of a preset ADSYNC cycle, and the plurality of slave units is synchronized in association with the minimum width of the preset data transmission preparation section and the minimum width of the preset ADSYNC cycle based on the ADSYNC outputted from the master unit.

4. The communication system according to claim 3, wherein the synchronization in association with the minimum width of the preset data transmission preparation section and the minimum width of the preset ADSYNC cycle represents that a width of a data transmission preparation section of a synchronized ADSYNC is greater than the minimum width of the preset data transmission preparation section and a synchronized ADSYNC cycle is greater than the minimum width of the preset ADSYNC cycle.

5. The communication system according to claim 1, wherein data transmission is performed by overlapping a communication protocol other than ADSYNC in the data transmission section.

6. A battery pack comprising:
a communication system according to claim 1; and
secondary batteries connected to the slave units of the communication system,
wherein the slave units comprise battery management systems to control the charge and discharge of the secondary batteries.

7. A battery operating system comprising:
a battery pack according to claim 6; and
a load which is supplied with power from the battery pack.

8. A method of synchronizing units in a communication system, the communication system comprising a plurality of slave units in which adjacent slave units are connected via a signal line, and a master unit connected to the plurality of slave units via a signal line, to synchronize the slave units, the method comprising:
(a) synchronizing all the slave units to a cycle of ADSYNC outputted from the master unit when the ADSYNC is outputted from the master unit, one cycle of the ADSYNC composed of a data transmission preparation section and a data transmission section;
(b) outputting free-run ADSYNCs from the slave units when ADSYNC is not outputted from the master unit; and
(c) synchronizing the slave units to any one free-run ADSYNC among the free-run ADSYNCs outputted from the plurality of slave units when the free-run ADSYNCs are outputted from the plurality slave units,
wherein the ADSYNC changes in logic level of a signal between the data transmission preparation section and a start point of the data transmission section.

9. The method of synchronizing units in a communication system according to claim 8, wherein the step (c) comprises synchronizing the slave units to free-run ADSYNC with a smallest width of a data transmission preparation section and a smallest width of an ADSYNC cycle among the free-run ADSYNCs outputted from the plurality of slave units.

10. The method of synchronizing units in a communication system according to claim 8, wherein the plurality of slave units stores a minimum width of a preset data transmission preparation section and a minimum width of a preset ADSYNC cycle, and
the step (a) comprises synchronizing the plurality of slave units in association with the minimum width of the preset data transmission preparation section and the minimum width of the preset ADSYNC cycle based on the ADSYNC outputted from the master unit.

11. The method of synchronizing units in a communication system according to claim 10, wherein the synchronizing in association with the minimum width of the preset data transmission preparation section and the minimum width of the preset ADSYNC cycle in the step (a) represents that a width of a data transmission preparation section of a synchronized ADSYNC is greater than the minimum width of the preset data transmission preparation section and a synchronized ADSYNC cycle is greater than the minimum width of the preset ADSYNC cycle.

12. The method of synchronizing units in a communication system according to claim 8, further comprising:
(d) transmitting data by overlapping a communication protocol other than ADSYNC in the data transmission section.

* * * * *